(12) United States Patent
So

(10) Patent No.: US 7,273,384 B1
(45) Date of Patent: Sep. 25, 2007

(54) UNIVERSAL BATTERY CHARGER AND/OR POWER ADAPTOR

(75) Inventor: Kam Wah So, Hong Kong SAR (CN)

(73) Assignee: Modern Sense Limited, Shaukeiwan, Hong Kong SAR (CN)

( * ) Notice: Subject to any disclaimer, the term of this patent is extended or adjusted under 35 U.S.C. 154(b) by 0 days.

(21) Appl. No.: 11/401,443

(22) Filed: Apr. 11, 2006

(51) Int. Cl.
*H01R 29/00* (2006.01)

(52) U.S. Cl. ........................ 439/172; 439/502

(58) Field of Classification Search ................ 439/172, 439/170, 171, 173, 174, 502, 638
See application file for complete search history.

(56) References Cited

U.S. PATENT DOCUMENTS

| | | | |
|---|---|---|---|
| 5,702,259 A | 12/1997 | Lee | |
| 5,848,907 A * | 12/1998 | Chen | 439/172 |
| 6,062,884 A | 5/2000 | Messimer et al. | |
| 6,139,359 A | 10/2000 | Fuhreck et al. | |
| 6,328,581 B1 | 12/2001 | Lee et al. | |
| 6,592,386 B2 | 7/2003 | Teng et al. | |
| 6,669,495 B2 | 12/2003 | Philips et al. | |
| 6,923,667 B1 * | 8/2005 | Chen | 439/172 |
| 6,942,508 B2 | 9/2005 | Wong | |
| 7,168,968 B1 * | 1/2007 | Li | 439/172 |
| 7,168,969 B1 * | 1/2007 | Wang | 439/173 |

FOREIGN PATENT DOCUMENTS

DE 19932942 3/2001

* cited by examiner

*Primary Examiner*—Hien Vu
(74) *Attorney, Agent, or Firm*—Leydig, Voit & Mayer, Ltd.

(57) ABSTRACT

A universal power adapter has a choice of configurations for use in different countries and with different items of electronic equipment. A plug base for pivot connection with the adapter body has conducting pins for connection with an electrical socket and corresponding electrical terminals connected electrically to the pins. A rotational safety cover is provided to shield the electrical terminals and avoid unintentional contact. The cover has openings permitting access to the terminals when the cover is rotated. The body has a lug for engaging the cover to rotate the cover when the body is secured rotatably to the base. A power cord extends from the body to a mating socket and detachable adaptor tips. A voltage selector switch for selecting voltage has a semi light transmissive indicator disk with a light beneath the disk indicating the selected output voltage and operational status of the adapter.

20 Claims, 9 Drawing Sheets

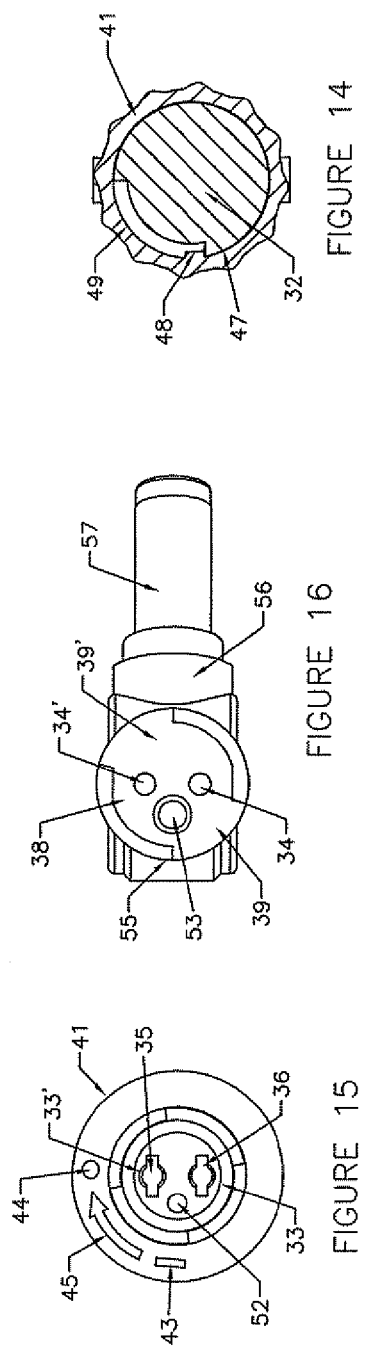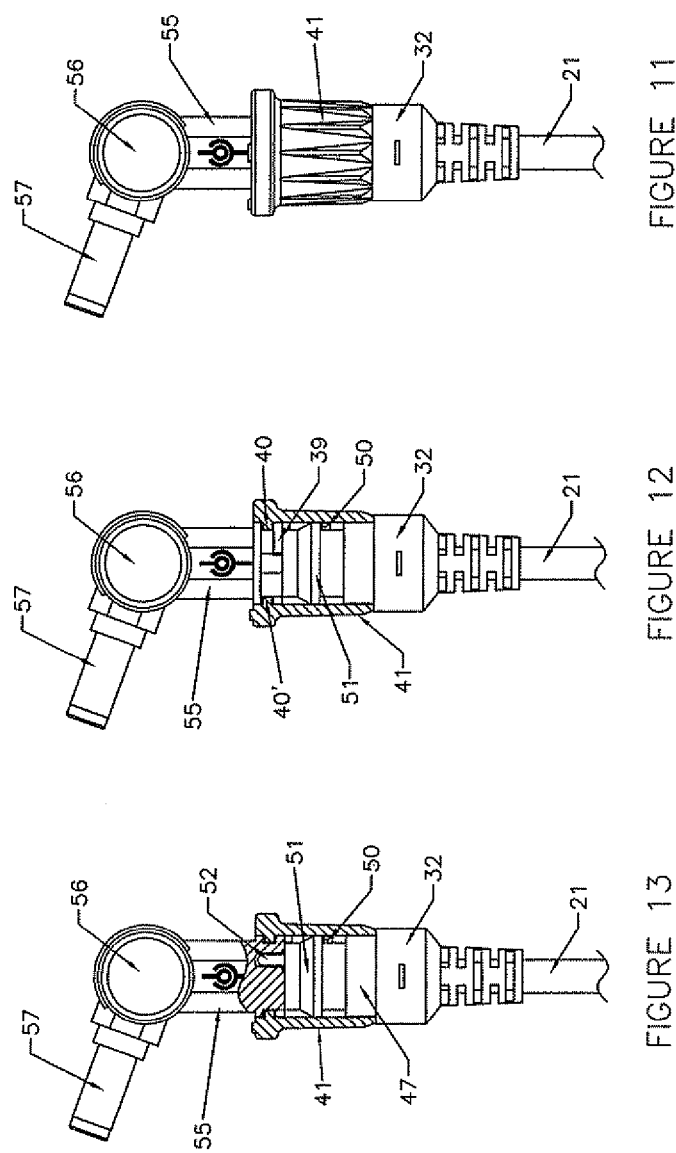

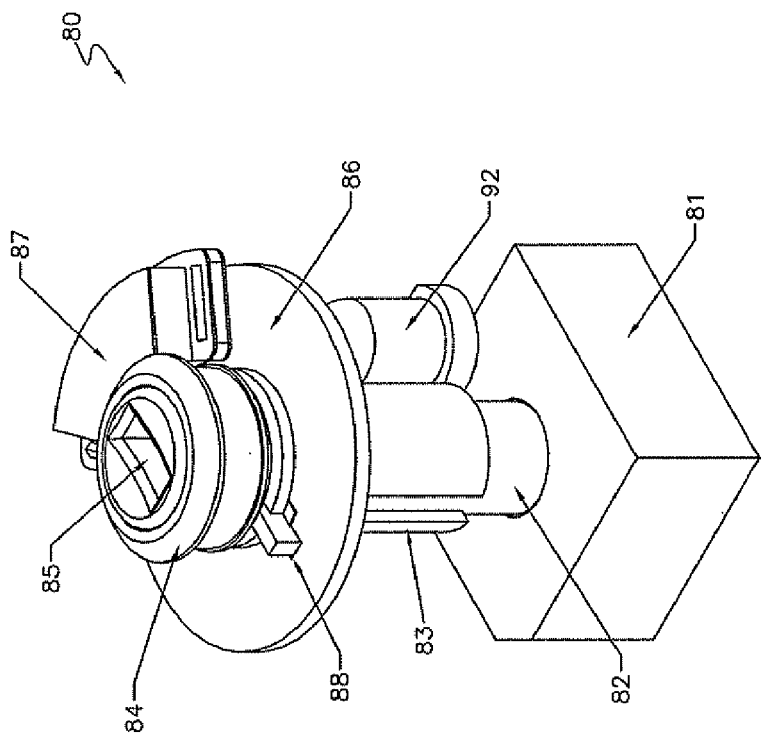
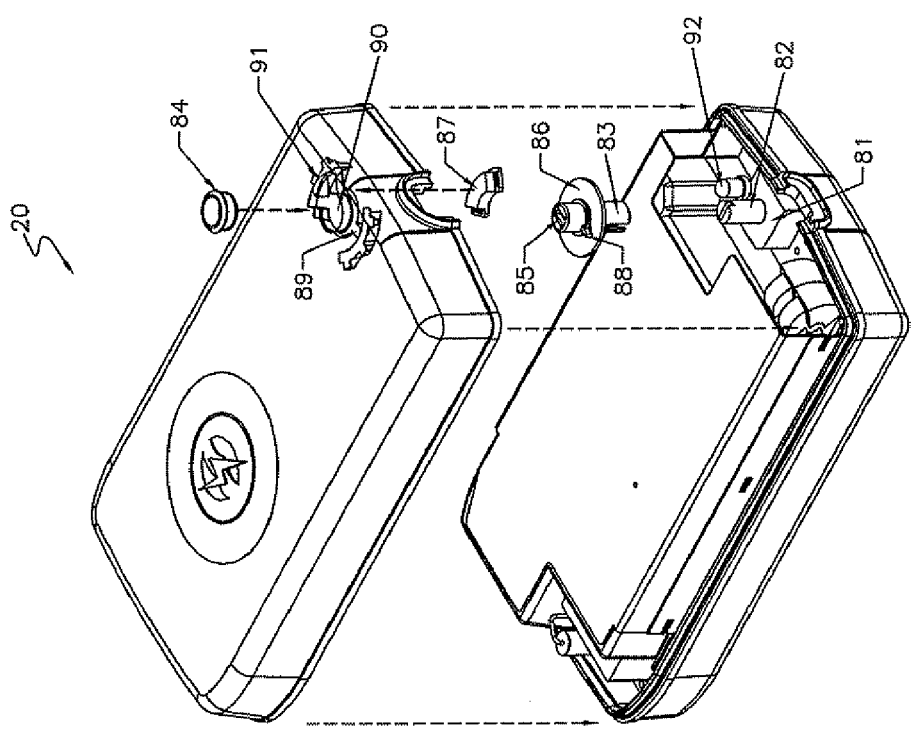
FIGURE 20
FIGURE 19

UNIVERSAL BATTERY CHARGER AND/OR POWER ADAPTOR

BACKGROUND OF THE INVENTION

The present invention relates to mains operated battery chargers and/or power adapter for portable electronic equipment. More particularly, although not exclusively, the invention relates to a universal battery charger and/or power adapter having a choice of configurations for use in different countries and with different equipment.

The pin configuration of mains power wall sockets and electrical plugs vary from country to country. When travelling with portable electronic equipment one often has to carry traveler adapters for the battery charger and/or power adapter to operate the equipment. These can be bulky, cumbersome items. Many people now possess more than one portable electronic device that they regularly carry with them. For example a person might possess a mobile phone, a personal media player (e.g. MP3 music player) and a laptop computer. When travelling such persons must also carry multiple charges and power adaptors, which are even more bulky and cumbersome than traveler adapters.

A person may also have problems at home with limited power outlets for connecting multiple charges and/or power adaptors for all of their portable electronic equipment.

OBJECTS OF THE INVENTION

It is an object of the present invention to overcome or substantially ameliorate at least one of the above disadvantages and/or more generally to provide an improved universal charger and/or power adapter having a choice of configurations for use in different countries and with different items of electronic equipment.

DISCLOSURE OF THE INVENTION

There is disclosed herein a universal power adapter, for use in countries having main electrical pin/socket patterns that allow no alternative plug-insertion orientations, comprising a base having conducting pins extending from one side thereof for insertion into apertures of an electrical power socket, electrical terminals located on the other side of the base and which correspond to each of the conducting pins and are connected electrically thereto, a rotational safety cover located to shield the electrical terminals and having openings for permitting access to the terminals when the cover is rotated, and engagable pivot connection features, and a body having engager pivot connecting features for cooperating with the engagable pivot connection features of the base to secure the body rotatably to the base, the body having rotator features for rotating the safety cover and electrical contacts configured to engage with the terminals of the base when the body and base are so secured.

There is also disclosed herein a base for a universal power adaptor having a body having electrical contacts and engager pivot connecting features for securing the body rotatably to the base, the base comprising conducting pins extending from one side of the base for insertion into apertures of an electrical power socket, electrical terminals located on an opposite other side of the base and which correspond to each of the conducting pins and are connected electrically thereto, a rotational safety cover located to shield the electrical terminals and having openings for permitting access to the terminals when the cover is rotated, and engagable pivot connection features for co-operating with the engager pivot connecting features of the body to secure the body rotatably to the base such that the electrical contacts of the base engage with the electrical terminals of the body when the body and base are so secured.

Further disclosed herein is a universal power adapter for use with different electrical appliances, the adapter comprising an adaptor body connectable with an electrical power system and a power cord extending from the body to a mating socket and a detachable adaptor tip at a remote end of the cord:

the mating socket comprising a connector body attached to the remote end of the power cord and having pin sockets in an end opposite the power cord, electrical terminals located in the pin sockets that are connected electrically to the power adaptor via conductors in the power cord, a locking collar rotatably located on the connector body and having a bayonet catch member on an internal wall, the detachable adaptor tip comprising an adaptor body having an electrical appliances connector at a first end and pin terminals at an opposite end for insertion into the pin sockets, wherein the electrical appliances connector is connected electrically to the pin terminals, and a locking lug on the adaptor body that is engageable with the bayonet catch member upon rotation of the locking collar to detachably secure the adaptor tip to the mating socket.

Still further disclosed herein is a universal power adapter, for use in countries having main electrical pin/socket patterns that allow no alternative plug-insertion orientations, comprising a base having conducting pins extending from one side thereof for insertion into apertures of an electrical power socket, electrical terminals located on the other side of the base and which correspond to each of the conducting pins and are connected electrically thereto and engagable pivot connection features, a body having engager pivot connecting features for co-operating with the engagable pivot connection features of the base to secure the body rotatably to the base and electrical contacts configured to engage with the terminals of the base when the body and base are so secured, and power converter electronics located in the base and connected to a voltage selector switch having an externally viewable portion for viewing a selected voltage, the viewable portion comprising a semi light transmissive indicator disk having voltage markings thereon and an illumination source located beneath the disk to illuminate it from behind.

Further disclosure of the invention is set forth in the following description.

BRIEF DESCRIPTION OF THE DRAWINGS

A preferred form of the present invention will now be described by way of example with reference to the accompanying drawings, wherein:

FIGS. 9, 10 and 11 are schematic illustrations of a mating socket and interchangeable adaptor tip of the power adaptor, FIGS. 12 and 13 are schematic section elevation illustrations through the mating socket and adaptor tip, FIG. 14 is a schematic section plan illustration through the mating socket, FIG. 15 is a schematic illustration of a top of the mating socket, FIG. 16 is a schematic illustration of a bottom of the adaptor tip, FIG. 19 is a schematic exploded illustration of the body, FIG. 20 is a view of the voltage selector.

DESCRIPTION OF THE PREFERRED EMBODIMENT

Figure 1:
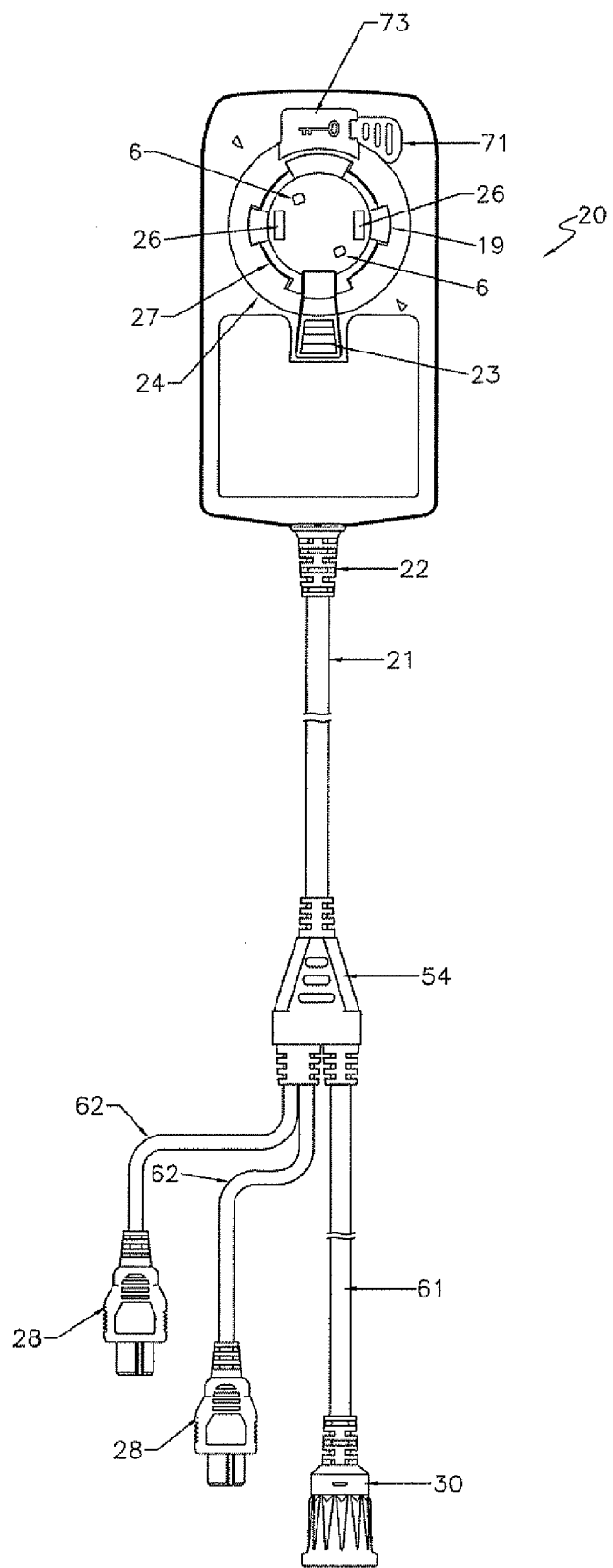
FIG. 1 is a schematic illustration of a universal power adaptor according to the invention.

Assignee of the inventor is owner of applications that already proposed an electrical adapter for use in countries having main electrical pin/socket patterns that allow no alternative plug-insertion orientations. This adaptor is described in U.S. Pat. No. 6,942,508 dated 13 Sep. 2005, the contents of which are incorporated herein by reference. The same disclosure also appears in European publication EP1437804A2 dated 14 Jul. 2004, Japanese publication P2004214206A2 dated 29 Jul. 2004, and Chinese publication CN1518169A dated August 2004.

In the accompanying drawings there is schematically depicted a universal charger and power adaptor for use in different countries and with various type of portable electronic equipment. The power adaptor has interchangeable plug bases 10 for use in power outlets of different countries. The power adapted has three outputs 28, 30 at the remote end of an output cord 21, 61, 62 for connection of interchangeable adaptor tips that fit different types of electronic equipment. Two outputs 28 have a 5.5V output for charging or powering equipment that can normally be charged/powered from a computer USB port, such as mobile phones, PDA's, handheld computers and audio (MP3) players. Interchangeable adaptor tips for such equipment push fit with outputs 28. The third outlet, mating socket 30, has a variable voltage output for powering/charging laptop computers and the like. The adaptor has a selectable voltage setting for choosing the voltage output of mating socket 30. Other interchangeable adaptor tips 31 connect with mating socket 30 for use with laptop computers and the like.

Figure 3:
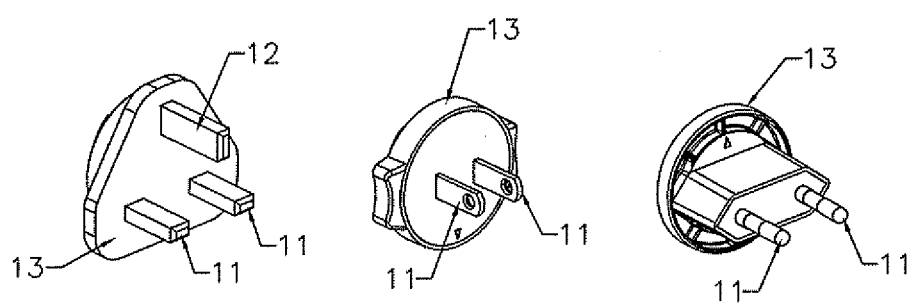
FIGS. 3 and 4 are schematic illustrations of various bases of the power adaptor.
Figure 4:
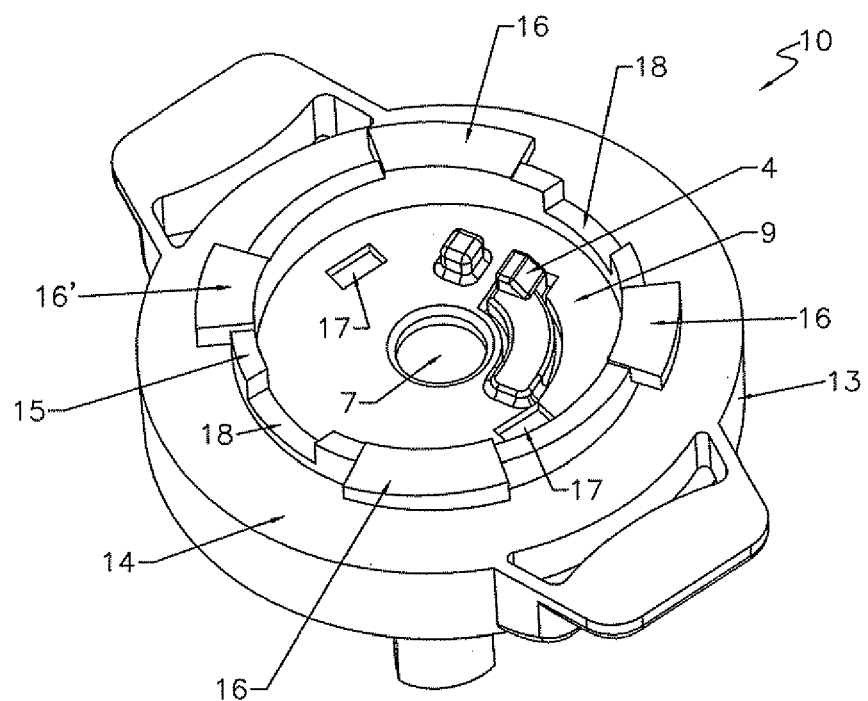

FIGS. 3 and 4 depict the interchangeable adapter base 10. The adapter base 10 is fabricated typically as a molding of plastics material and includes a plate 13 having two or three projecting metallic electrically conductive pins projecting from one side. There are active and neutral pins 11 and an earth pin 12. The adapter base 10 of FIG. 4 has its pins configured in the Australasian layout, while other bases 10 depicted in FIG. 3 show British, USA and European layouts. It should be appreciated that the pin configuration could equally be that of any country.

At the other side of the plate 13 there is provided a flat bearing surface 14 formed as an integral molding therewith. Located internally and concentrically with the bearing surface 14 is an inner circular aperture 7 and an outer circular rail 15. Between the aperture and rail there is defined an annular channel 9 having a pair of diametrically opposed terminals 17. One of the terminals is connected electrically with either the active or neutral pin 11 and the other terminal is connected to the other pin 11. There might also be a further terminal connected with the earth pin 12.

The outer rail 15 has extending therefrom four bayonet lugs 16. Each bayonet lug 16 is spaced from the bearing surface 14 and includes a circumferentially extending ramped upper surface. Diametrically opposed pairs of the bayonet lugs 16 are of the same size, yet adjacent pairs of the bayonet lugs are of differing size.

Figure 2:
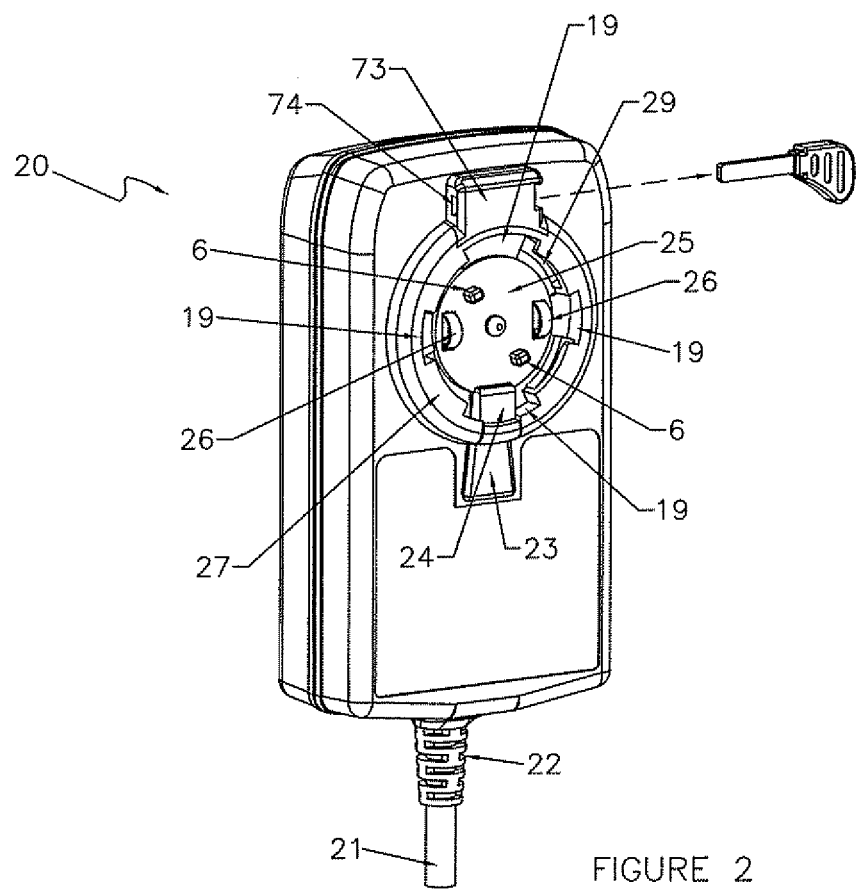
FIG. 2 is a schematic illustration of a body of the power adaptor.

FIG. 2 depicts the adapter body 20 for bayonet-interconnection with the base 10. The body 20 is typically fabricated from several plastics molded parts that are screwed, snapped or welded together ultrasonically. The body encloses a power converter module for converting a mains electricity input in to a 5.5V regulated DC output for outlets 28 and a variable output for mating socket 30. The body has extending from it via a rubber grommet 22 an output power cord 21 connected to the output of the converter module. The output cord separates at a splitter 54 into separate cords 61, 62 to the outlets 28 and mating socket 30.

The plug body 20 includes a flat circular bearing ring 27 for engagement with the bearing ring 14 of the adapter base 10. There is a central recess 25 in which there is located a pair of diametrically opposed electrical spring contacts 26. These spring contacts are connected electrically with an input of the power converter module. Located around the central recess 25 there are four openings 19. Diametrically opposed pairs of the openings 19 are of the same size, whereas adjacent pairs are of different size. By this arrangement, bayonet lugs 16 of the adapter base 10 can be lowered into the openings 19 of the plug body 20 in only two possible orientations 180 degrees apart. Alongside each opening 19 and situated beneath the bearing ring 27 are lug-receiving slots 29. Bayonet lugs 16 of the adapter base 10 can be lowered into the openings 19 of the plug body 20 and the base 10 and body 20 turned relative each other to engage the base lugs 16 in the receiving slots 29 to secure the base 10 to the body 20.

Situated alongside and projecting within one of the openings 19 is a locking device comprising an interlock tongue 24 and an activator 23 formed integrally therewith. With reference again to FIG. 4, the outer rail 15 includes a pair of diametrically opposed interlock recesses 18 into one of which the tongue 24 snap-engages upon bayonet-fitting of the base 10 and body 20. The activator 23 is an integral part of the body 20 and has a pair of cut-outs at either side enabling downward movement of the interlocked tongue 24 upon application of finger-pressure to the activator 23. It is only upon this application of finger pressure that the interlocked base 10 and body 20 can be detached.

In use, when parts 10 and 20 are snap-engaged upon bayonet-fitting the terminals 17 of the base 10 engage the electrical spring contacts 26 of the body 20 creating electrical contact between the pins 11, 12 and power converter module. By this arrangement the pin layout of the universal battery charger/power adapter can be changed for use in any country by interchanging the base 10.

To avoid exposed live contacts of the mating plug base 10 if it is inserted into a wall socket without connection to the adaptor body 20 the mating plug 10 is provided with a safety cover arrangement 1.

Figures 5, 6:
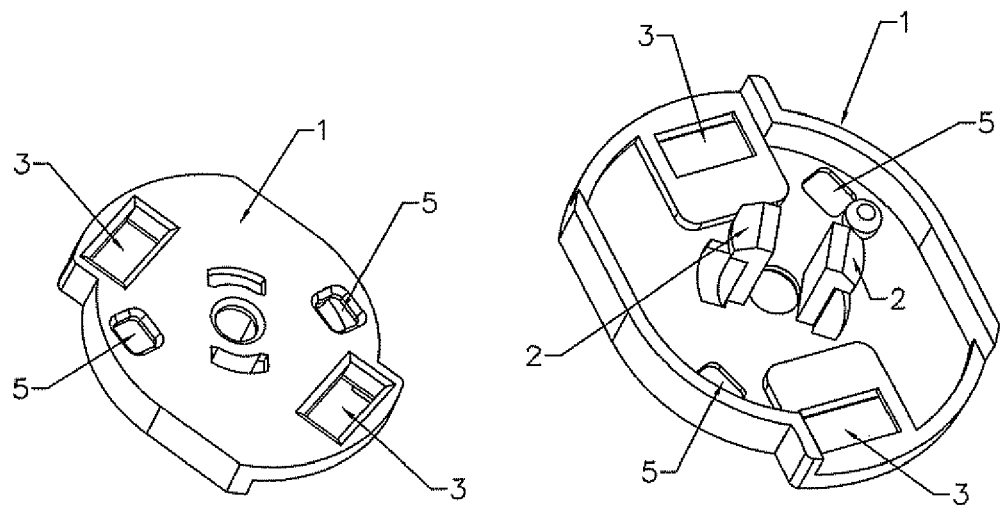
FIGS. 5 and 6 are top and bottom illustrations respectively of a safety cover for a base.
Figure 7:
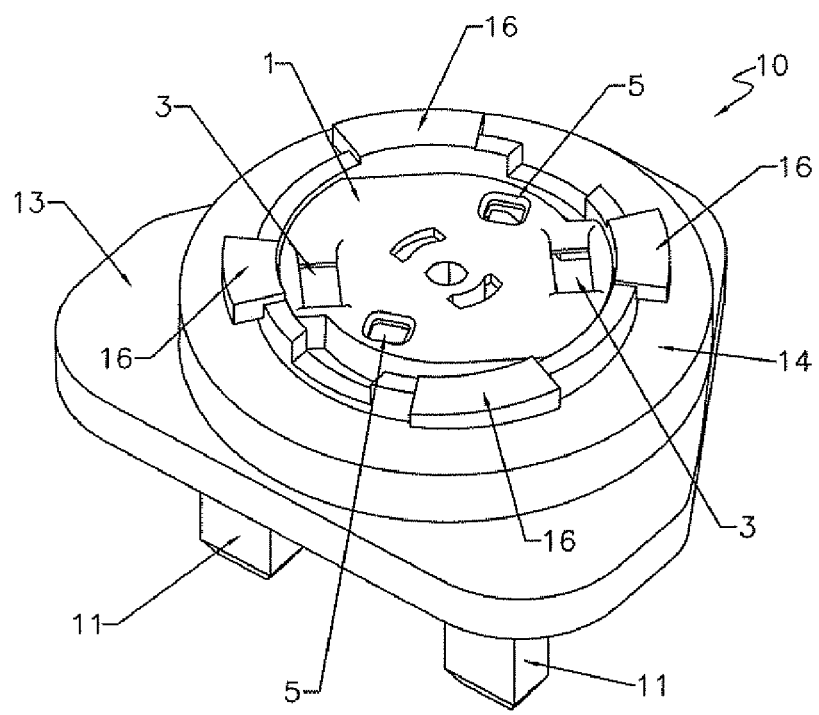
FIG. 7 is a schematic illustration of a base with the safety cover fitted.
Figure 8:
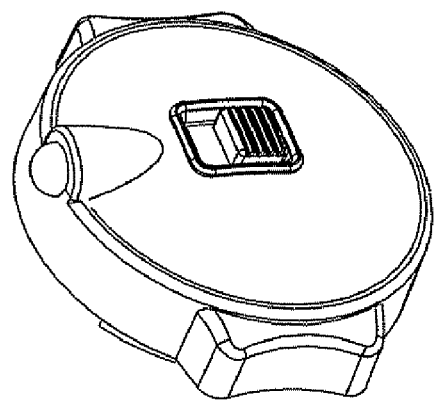
FIG. 8 is a schematic illustration of a cover for concealing the connector portion of the body.
Figure 9:
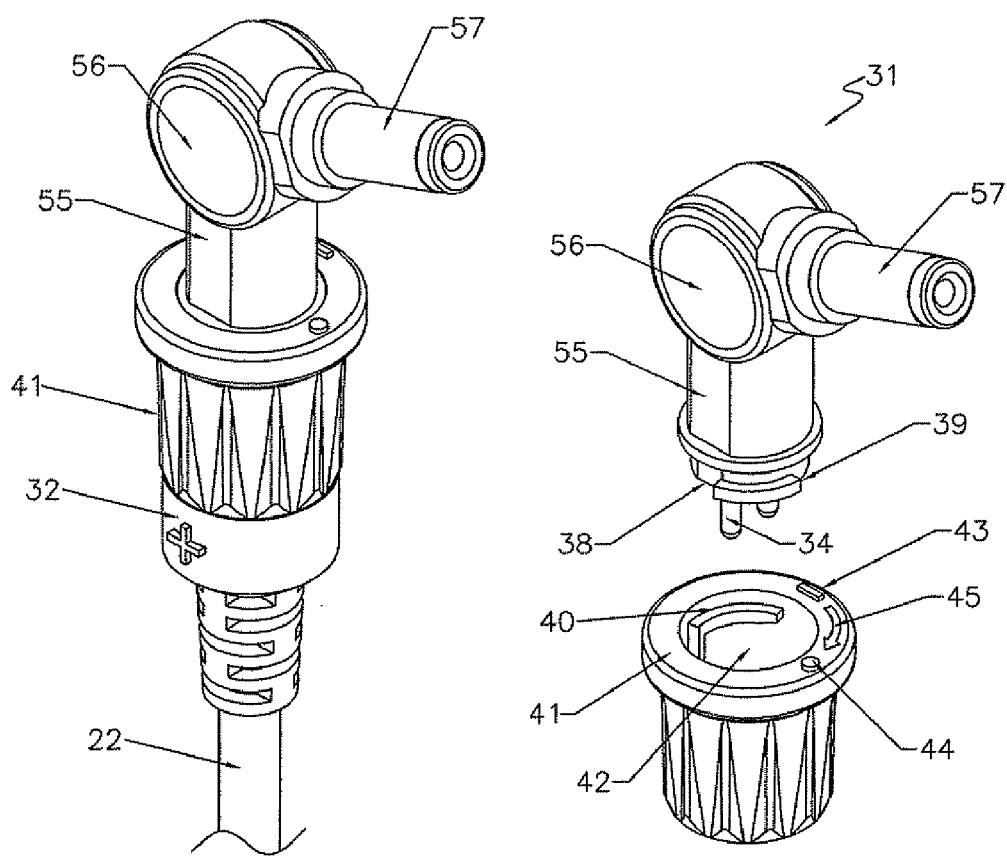
Figure 10:
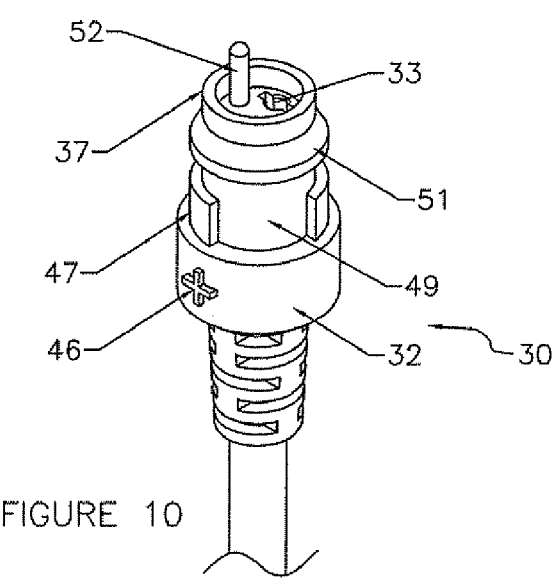

FIGS. 5 to 7 depict the safety cover 1. The safety cover 1 is a molded annular shaped body that locates within annular channel 9 of the base 10. Connector catches 2 engage within aperture 7 of the base 10 to rotatably secure the cover 1 within the annular channel 9. The safety cover 1 has two diametrically opposed apertures 3 which when the cover 1 is in a certain rotational alignment expose the terminals 17 of the base 10. Upon rotational movement of the cover 1 the cover shields the electrical terminals 17. In its safe position to shield the terminals 17 the safety cover 1 prevents contact with terminals 17 if the base 10 is inserted into a wall socket without connection to a body 20. A resilient catch 4 within channel 9 of the base 10 engages with one of two diametrically opposed locking apertures 5 in the cover 1 to prevent any unintentional rotation of the cover 1 to expose the terminals 17.

Located in the recess 25 of base 20 are two safety release lugs 6. In use, when the base 10 is aligned with corresponding connector parts on the body 20 one of the safety release lugs 6 extends through one of the apertures 5 of the safety cover 1 depressing catch 4. Upon rotation of the base 10 or body 20 relative the other for bayonet fitting of the two components the lug 6 causes the cover 1 to rotate to permit access through apertures 3 of electrical terminals 17 by electrical spring contacts 26. Upon removal of the base 10 from body 20 by turning in the opposite direction to release the bayonet fitting of the components, the lugs 6 rotate the cover 1 back to the shielded position covering terminals 17. As base 10 is drawn away from body 20 locking catch 4 again engages one of secondary apertures 5 locking the safety cover 1 in place.

Figure 21:
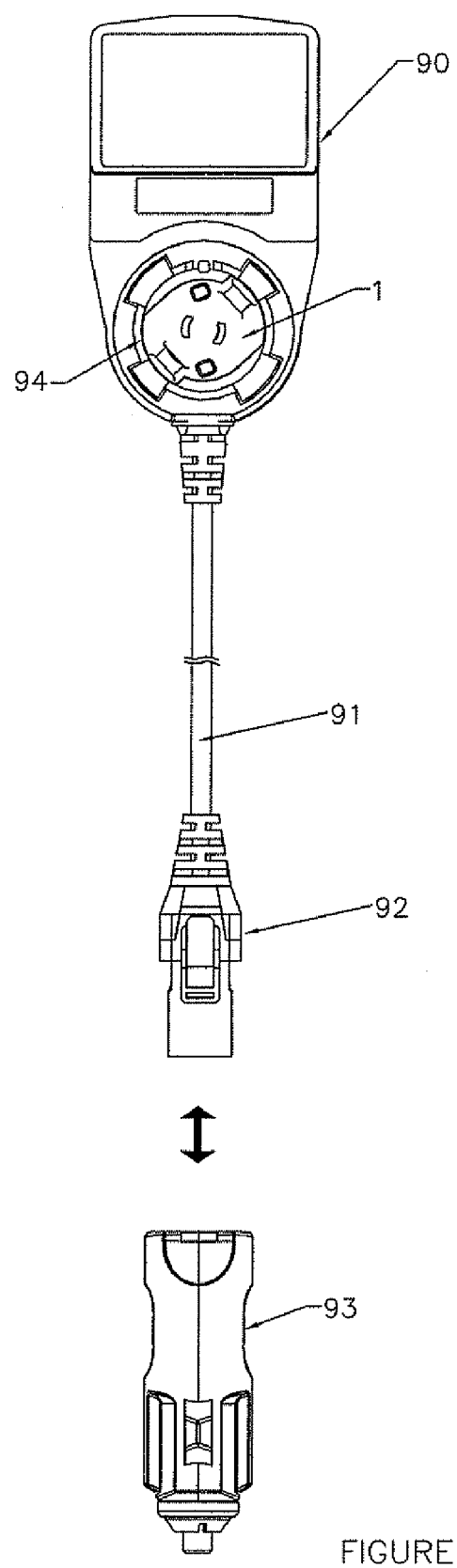
FIG. 21 illustrates an alternative base having an extension cord extending therefrom with in-flight and/or auto plugs at its remote end.

It is envisaged that the base of the electrical adapter need not the configured with pins to be received directly by apertures of a mating socket. For example, and as shown in FIG. 21, the base might comprises a 12/15V DC to 110V AC power inverter module 90 have an extension cord 91 extending therefrom and at the remote end of which there is a standard in-flight plug 92 for connection to a 15V seat outlet available in commercial aircraft. An auto adapter 93 is also provided for receiving the in-flight plug to allow connection to a standard 12V DC automotive "cigarette lighter" outlet. The inverter module 90 has pivot connecting features 94 substantially identical to those of the base 10 depicted in FIG. 4 for connection with adaptor body 20. The pivot connecting features 94 include the safety cover 1 to avoid exposed live contacts of the inverter module 90 if plugs 92, 93 are inserted into sockets without connection to the adaptor body 20.

FIGS. 9 to 16 depict the mating socket 30 and interchangeable adaptor tip 31 located at the remote end of output cord 21, 61. The mating socket 30 comprises a cylindrical connector body 32 molded to the cord end. The distal end of the mating body 32 has pin sockets 33 for receiving electrical pins 34 of the adaptor tip 31. Within the pin sockets 33 there are electrical terminals 35, 36 connected to the variable voltage output of the adaptor module via conductors in the cord 22, 61. The electrical terminals are resiliently deformable metal contacts for engaging the pins 34 in known manner. Extending from the distal end of the connector body 32 adjacent the pin sockets 33 is an orientation pin 52, which makes no electrical contact within the adaptor module. At the top of body 32 surrounding the pin sockets 33 there is a mating collar 37 that mates with the underside 38 of the adaptor tip 31 when its pins 34 are inserted within the pin sockets 33.

A locking collar 41 is rotatably located about the connector body 32 and has on its internal wall 42 an L-shaped bayonet catch 40. The locking collar 41 has a circumferential retaining tab 50 which can pass over and lock beneath a retaining ring 51 on the connector body 32 for locating and retaining the locking collar 41 in place. A top ring of the locking collar 41 has indication insignia 43, 44 and an arrow 45 indicating the direction of locking the collar.

The adaptor tip 31 is fabricated typically of a molding of plastics material having a connector stem 55 and an angle adaptor head 56 with plug top 57 for connection with the power inlet of an electronic device. Different ones of the interchangeable adaptor tips 31 will have different plug tops 57. A user may have available a variety of adaptor tips 31 with various plug top 57 configurations for connecting to different types of portable electronic device. The user may choose an adaptor tip suitable to his particular device and connect the adaptor tip to the mating socket 30. The importance of the adaptor tip 31 construction is the arrangement of the connector stem 55 for mating with the mating socket 30. The connector stem 55 has a pair of diametrically opposed locking lugs 39 extending radially from its wall adjacent end 38 which has extending therefrom the electrical pins 34. The under side 38 of the adaptor tip 31 also has an orientation socket 53 into which the orientation pin 52 of the mating socket 30 locates to ensure a correct orientation insertion of the terminal pins 34 within the pin sockets 33.

When the adaptor tip 31 is engaged with the mating socket 30 the locking collar 41 can be rotated to engage the bayonet catch 40 with the locking lug 39 of the adaptor tip. An indication 46 on the side wall of connector body 32 aligns with one of the indicators 34 when the locking collar 41 is rotated to the locking position, which is also signaled when a lip of the L-shaped bayonet tab 40 engages with the edge of locking lug 39 preventing further rotation of the collar 41.

With no adaptor tip 31 engaged with the mating socket 30 the locking collar 41 would be rotatable continuously in any direction. This may make it cumbersome to insert an adaptor tip 31 to the mating socket 30 if the locking collar 41 is misaligned. To overcome this, a semi-circumferential band 47 with disjoined ends is located about a recess portion of connector body 32. The internal wall 42 of the locking collar 41 has a longitudinal projection 48 which locates in the space 49 between the disjoined ends of the band 47. The projection 48 engages in either direction with the ends of the band 47 to limit rotational movement of the locking ring 41 to 90 degrees so that a user can readily turn the locking collar 41 to the locked or unlocked positions regardless of engagement of an adaptor tip 31.

Figure 17:
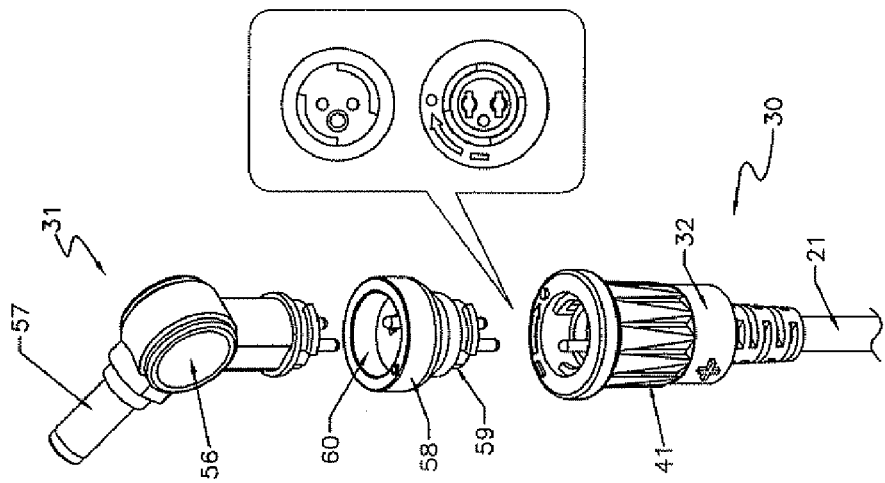
FIG. 17 is a schematic illustration of the mating socket, adaptor tip with an orientation adaptor.

FIG. 17 depicts an orientation adaptor 58. If the need arises to alter the orientation of the adaptor tip the orientation adaptor 58 is used between the mating socket 30 and adapter tip 31. The orientation adaptor 58 has a body with male and female ends. The male end 59 has a pin arrangement and orientation socket corresponding to a first orientation alignment for engagement with the connector body 32. The female end 60 has pin sockets for receiving the adaptor tip pins 34 and an orientation pin arranged in the alternate orientation configuration to allow connection of the adaptor tip 31 in a 180 degree orientation thus reversing the adaptor tip orientation.

Figure 18:
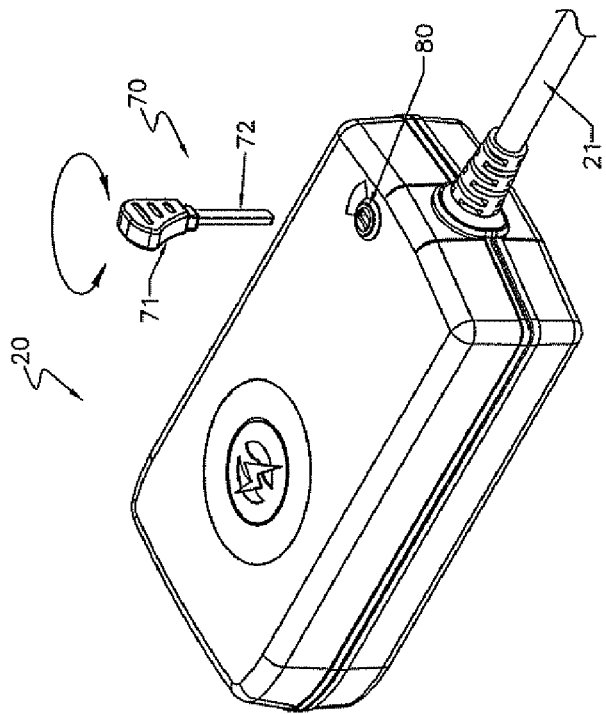
FIG. 18 is a schematic illustration of the back of the body showing a voltage selector and key.

FIGS. 18 to 20 depict a voltage selector 70. On a reverse side of adaptor body 20 is an externally exposed voltage selector mechanism 80 that is operated by a voltage selector key 70. The key has a handle 71 and a rectangular shaft 72 that fits within a barrel slot of the selector 80. Referring again to FIG. 2, when it is not in use the key 70 is stored in a key block 73 on the front of the body 20. The key block 73 is integrally molded with the body casing and includes a bore 74 into which the key shaft 72 frictionally engages.

The voltage selector mechanism for the mating socket 30 output is located within the adaptor body is depicted in FIG. 20. It comprises an adjustable selector switch 81 of known type that is connected to the converter module for selecting the adaptor output voltage in known manner. The selector switch 81 has a rotary selector shaft 82 extending therefrom to which the selector switch assembly 83 is connected. The externally exposed portion of the selector switch assembly 83 includes a finishing bush 84 for locating the rotary selector switch within an aperture 90 of the external housing and a centrally located selector switch slot 85 into which the key shaft 72 is inserted for rotating the voltage selector 80. A disk shaped semi-transparent voltage indicator dial 86 is located about the switch assembly 83 and is visible to a user through a semi-circular shape transparent window glass 87 located in a semi-circular shape opening 91 of the external housing.

A tab 88 projects from the rotary switch 83 and is engagable upon a stop 89 in the housing to prevent continuous 360° rotation of the selector switch which would cause instantaneous voltage jump from the minimum selectable output voltage to the maximum selectable output voltage or visa versa. The tab 88 and stop 89 require the user to turn the selector switch through the intermediary voltages when transiting from the minimum to maximum voltage settings or vice versa.

An operational indicator LED 92 is positioned in line with window glass 87 and beneath the semi-transparent indicator dial 86. The operation LED 92 provides operational indication to a user of the device in the following way. When the adaptor plug is connected to an electrical supply the LED 92 illuminates continually to indicate normal operation of the device. If the power adapter is operating normally the LED is lite continuously. If the output of the power adapter is overloaded then the indicator LED blinks steadily and if the output is under a short circuit the indicator LED is off. An advantage of the LED indicator 92 being located beneath the voltage indicator dial 86 is that it illuminates the dial for easy output voltage setting reference by the user without the need for an extra illumination LED. This improves efficiency and reduces component count of the device.

It should be appreciated that modifications and alterations obvious to those skilled in the art are not to be considered as beyond the scope of the present invention.

The invention claimed is:

1. A universal power adapter, for use in countries having main power outlet pin/socket patterns that allow no alternative plug-insertion orientations, comprising:
    a base having
        conducting pins for connection with an electrical power socket,
        electrical terminals which correspond to each of the conducting pins and are respectively connected electrically to the pins, and
        a rotational safety cover located to shield the electrical terminals and having openings for permitting access to the terminals when the cover is rotated, and engagable pivot connection features; and
    a body having engager pivot connecting features co-operating with the engagable pivot connection features of the base to secure the body rotatably to the base, the body having rotator features for rotating the safety cover, and electrical contacts configured to engage the terminals of the base when the body and base are secured together, wherein the rotational safety cover further includes a lock to prevent inadvertent rotating of the safety cover when the body is not secured rotatably to the base.

2. The universal power adapter of claim 1 wherein the conducting pins extend from one side of the base for insertion into apertures of an electrical power socket and the electrical terminals are located on the other side of the base.

3. The universal power adapter of claim 1 wherein the base has extending therefrom a power cord at a remote end of which is located a plug having the conducting pins for connection with an electrical power socket and wherein the electrical terminals are connected electrically to each of the conducting pins via individual conductors in the power card.

4. The universal power adapter of claim 3 wherein the base further includes an inverter for transforming a direct current power supply to the conducting pins into an alternating current supply at the electrical terminals.

5. The universal power adapter of claim 3 wherein the plug is of a type for use with an aircraft or automotive power supply.

6. The universal power adapter of claim 1 wherein the rotator features comprises a lug for engaging the safety cover to cause it to rotate when the body is secured rotatably to the base.

7. The universal power adapter of claim 1 wherein the lock comprises an aperture in the cover and a resiliently deformable tab on the base that locates within the aperture to prevent rotational movement of the cover.

8. The universal power adapter of claim 7 wherein the rotator features comprises a lug for insertion into the safety cover aperture when the base and body are mated for securing the body to the base such that the lug displaces the tab and engages the safety cover to cause it to rotate when the body is secured rotatably to the base.

9. The universal power adapter of claim 1 further including a removable cover for concealing the electrical contacts of the body, the removably cover including engagable pivot connection features for rotatably connecting with the body and a battery-operated portable electric light.

10. A base for a universal power adaptor having a body having electrical contacts and engager pivot connecting features for securing the body rotatably to the base, the base comprising,
    conducting pins extending from a first side of the base for insertion into apertures of an electrical power socket,
    electrical terminals located on a second side, opposite the first side, of the base and which correspond to each of the conducting pins and are respectively connected electrically to the pins,
    a rotational safety cover located to shield the electrical terminals and having openings for permitting access to the terminals when the cover is rotated, wherein the safety cover includes a lock to prevent inadvertent rotating of the safety cover when the body is not secured rotatable to the base, and
    engagable pivot connection features co-operating with the engager pivot connecting features of the body to secure the body rotatably to the base so that the electrical contacts of the base engage the electrical terminals of the body when the body and base are secured together.

11. The base of claim 10 wherein the lock comprises an aperture in the cover and a resiliently deformable tab on the base that locates within the aperture to prevent rotational movement of the cover.

12. A universal power adapter for use with different electrical appliances, the adapter comprising:
    an adaptor body connectable with an electrical power system:

a power cord extending from the body to a mating socket; and a detachable adaptor tip at a remote end of the cord, the mating socket comprising:

a connector body attached to the remote end of the power cord and having pin sockets in an end opposite the power cord, wherein the connector body includes a mating collar for mating with the adaptor body upon insertion of the pin terminals into the pin sockets, electrical terminals located in the pin sockets that are connected electrically to the power adaptor via conductors in the power cord, and a locking collar rotatably located on the connector body and having a bayonet catch member on an internal wall, and the detachable adaptor tip comprising:

an adaptor body having an electrical appliance connector at a first end and pin terminals at an opposite end for insertion into the pin sockets, wherein the electrical appliance connector is connected electrically to the pin terminals, and a locking lug on the adaptor body that is engageable with the bayonet catch member upon rotation of the locking collar to detachably secure the adaptor tip to the mating socket.

13. The universal power adapter of claim 12 wherein the bayonet catch comprises a circumferentially extending tab and an axial lip at an end of the tab, the locking lug engaging the axial lip upon a full rotation of the locking collar to secure the adaptor tip to the mating socket.

14. The universal power adapter of claim 12 wherein the mating collar surrounds the pin sockets on an end opposite the power cord.

15. The universal power adapter of claim 12 further comprising semi-circumferential band with disjoined ends about the connector body and a projection on the locking collar that is in situ located between the disjoined ends of the band to restrain rotational motion of the locking collar on the connector body.

16. The universal power adapter of claim 12 further comprising a retaining ring on the connector body and a corresponding retaining tab on the locking collar cooperating with the retaining ring for securing the locking collar to the connector body.

17. The universal power adapter of claim 12 further comprising an aperture in the adaptor body and a corresponding pin on the connector body for insertion into the aperture when the pin terminals and pin sockets cooperate in a correct orientation.

18. The universal power adapter of claim 12 further including at least one further power cord connected with the body and at least one further mating socket and detachable adaptor tips located at a remote end of the further power cord.

19. The universal power adapter of claim 18 wherein the mating socket has a selectable output voltage and the further mating socket has a fixed output voltage.

20. A universal power adapter, for use in countries having main electrical pin/socket patterns that allow no alternative plug-insertion orientations, comprising:

a base having conducting pins extending from a first side of the base for insertion into apertures of an electrical power socket, electrical terminals located on a second side of the base and which correspond to each of the conducting pins and are respectively connected electrically to the pins, and engagable pivot connection features, a body having engager pivot connecting features cooperating with the engagable pivot connection features of the base to secure the body rotatably to the base, and electrical contacts configured to engage with the terminals of the base when the body and base are secured together, and power converter electronics located in the base and connected to a voltage selector switch having an externally viewable portion for viewing a voltage selection, the viewable portion comprising a semi light transmissive indicator disk having voltage markings thereon and an illumination source located beneath the disk to illuminate the disk from behind, wherein the illumination source is connected to the converter electronics and is controlled in illumination state to indicate respective operational states of the converter electronics.

* * * * *